United States Patent
Oji

(10) Patent No.: US 9,586,444 B2
(45) Date of Patent: Mar. 7, 2017

(54) PNEUMATIC TIRE

(71) Applicant: SUMITOMO RUBBER INDUSTRIES, LTD., Kobe-shi, Hyogo (JP)

(72) Inventor: Takuya Oji, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 791 days.

(21) Appl. No.: 13/750,372

(22) Filed: Jan. 25, 2013

(65) Prior Publication Data

US 2013/0192731 A1 Aug. 1, 2013

(30) Foreign Application Priority Data

Jan. 26, 2012 (JP) ................... 2012-014456

(51) Int. Cl.
*B60C 11/03* (2006.01)
*B60C 11/13* (2006.01)

(52) U.S. Cl.
CPC ..... *B60C 11/0306* (2013.04); *B60C 2011/036* (2013.04); *B60C 2011/0341* (2013.04); *B60C 2011/0353* (2013.04); *B60C 2011/0358* (2013.04); *B60C 2011/0362* (2013.04); *B60C 2011/0365* (2013.04); *B60C 2011/0369* (2013.04); *B60C 2011/0372* (2013.04); *B60C 2011/0383* (2013.04); *B60C 2011/1213* (2013.04)

(58) Field of Classification Search
CPC ......... B60C 11/0306; B60C 2011/0365; B60C 2011/0369; B60C 2011/0383; B60C 2011/0372; B60C 2011/0353
See application file for complete search history.

(56) References Cited

U.S. PATENT DOCUMENTS

| 5,135,038 A | * | 8/1992 | Graas | ................. B60C 11/0306 |
| | | | | 152/209.18 |
| 2002/0011291 A1 | | 1/2002 | Ikeda | |
| 2010/0078105 A1 | * | 4/2010 | Hashimoto | ......... B60C 11/0306 |
| | | | | 152/209.18 |

FOREIGN PATENT DOCUMENTS

| JP | 03157209 A | * | 7/1991 |
| JP | 04002508 A | * | 1/1992 |

(Continued)

OTHER PUBLICATIONS

Machine Translation: JP 2005280455 A; Hino, Hidehiko; no date.*

(Continued)

*Primary Examiner* — Steven D Maki
*Assistant Examiner* — Kendra Ly
(74) *Attorney, Agent, or Firm* — Birch, Stewart, Kolasch & Birch, LLP

(57) ABSTRACT

A tread portion of a pneumatic tire includes inner land portions between outer circumferential main grooves disposed most on tread ground-contact end sides and at least one inner circumferential main groove on the inner side thereof. The inner land portions are divided into inner blocks by inner lateral grooves inclined at an angle α of 10 to 40°. The inner lateral grooves consist of first inner lateral grooves and second inner lateral grooves which are alternately arranged in a circumferential direction. The first inner lateral grooves include a wide-width part connecting to the outer circumferential main groove and a narrow-width part connecting to the inner circumferential main groove.

11 Claims, 7 Drawing Sheets

(56) References Cited

FOREIGN PATENT DOCUMENTS

| | | | | |
|---|---|---|---|---|
| JP | 2879683 | B2 | * | 4/1999 |
| JP | 2001-206020 | A | | 7/2001 |
| JP | 2005280455 | A | * | 10/2005 |
| JP | 2008221955 | A | * | 9/2008 |
| JP | 2010215103 | A | * | 9/2010 |
| JP | 2010254222 | A | * | 11/2010 |

OTHER PUBLICATIONS

Machine Translation: JP2879683B2; Kuno, S; no date.*
Machine Translation: JP 2010215103 A; Ishizaka, Takahide; no date.*
Machine Translation: JP 2008221955 A; Ebiko, Masahiro; no date.*
Machine Translation: JP 2010254222 A; Yamamoto, Hirotatsu; no date.*

* cited by examiner

PNEUMATIC TIRE

BACKGROUND OF THE INVENTION

Field of the Invention

The present invention relates to a pneumatic tire with improved noise performance and uneven wear resistance, without deteriorating drainage performance.

Description of the Related Art

As a pneumatic tire with improved wear resistance and drainage performance, Japanese Patent Application Publication No. 2001-206020 describes a pneumatic tire having a tread pattern as shown in FIG. 7. This tire includes, in a tread portion a, five circumferential main grooves b, for example, including outer circumferential main grooves b1 which are disposed most on tread ground-contact ends Te and inner circumferential main grooves b2 which are adjacent to the outer circumferential main grooves b1 axially inwardly with this, outer land portions c1 are formed on axially outer sides of the outer circumferential main grooves b1, inner land portions c2 are formed between the inner and outer circumferential main grooves b1, b2, and center land portions c3 are formed between the inner circumferential main grooves b2 and a central circumferential main groove b3.

In addition, multiple inner lateral grooves h are provided in the inner land portions c2. This divides the inner land portion c2 into multiple circumferentially arranged inner blocks g. The inner lateral grooves h extend in an arc-like manner from the outer circumferential main groove b1 to the inner circumferential main groove b2, while gradually increasing an angle α with respect to an axial line above 30°.

In a tire with such a pattern, however, the uneven wear resistance is not sufficient in the inner blocks g, and further improvement is desired. Note that it is proposed to enhance the uneven wear resistance by reducing a groove width of the inner lateral grooves h to improve rigidity of the inner blocks g. This case, however, results in a disadvantage that the drainage performance deteriorates and wet performance deteriorates.

Hence, an object of the present invention is to provide a pneumatic tire which can enhance uneven wear resistance without deteriorating drainage performance, and contribute to enhancement of noise performance.

SUMMARY OF THE INVENTION

In order to solve the problem described above, a first aspect of the invention of the present application is a pneumatic tire including three or more circumferential main grooves in a tread portion, including outer circumferential main grooves disposed most on tread ground-contact end sides and at least one inner circumferential main groove adjacent to the outer circumferential main grooves axially inwardly, the pneumatic tire wherein
  inner land portions disposed between the inner and outer circumferential main grooves are divided into multiple circumferentially arranged inner blocks by multiple inner lateral grooves traversing the inner land portions,
  a groove centerline of the inner lateral grooves is inclined at an angle α of 10 to 40° with respect to an axial line,
  the inner lateral grooves are formed of first inner lateral grooves and second inner lateral grooves which are alternately arranged in a circumferential direction,
  the first inner lateral grooves include:
    a wide-width part on an axially outer side and connecting to the outer circumferential main groove, and
    a narrow-width part on an axially inner side and connecting to the inner circumferential main groove,
  the second inner lateral grooves include:
    a constricted part having a minimum groove width and disposed on a center side in a groove length direction,
    an outer widened part whose width gradually increases from the constricted part to the outer circumferential main groove, and
    an inner widened part whose width gradually increases from the constricted part to the inner circumferential main groove,
  a groove depth of the second inner lateral grooves is almost constant over its entire length, and
  a groove depth of the narrow-width part of the first inner lateral groove is smaller than a groove depth of the wide-width part of the first inner lateral groove.

In addition, in a second aspect of the invention, the inner block includes an acute-angle-side corner part and an obtuse-angle-side corner part at a position where the second inner lateral groove intersects with the outer circumferential main groove, and,
  at an acute-angle-side groove side edge of the second inner lateral groove which constitutes the acute-angle-side corner part, a tangent line of the acute-angle-side groove side edge at a tip of the acute-angle-side corner part has an angle $\theta 2o$ in the range of 0 to 10° with respect to the axial line.

In addition, in a third aspect of the invention, the inner block includes an acute-angle-side corner part and an obtuse-angle-side corner part at a position where the second inner lateral groove intersects with the inner circumferential main groove, and,
  at an obtuse-angle-side groove side edge of the second inner lateral groove which constitutes the obtuse-angle-side corner part, a tangent line of the obtuse-angle-side groove side edge at a tip of the obtuse-angle-side corner part has an angle $\theta 2i$ with respect to the axial line, which is larger than the angle $\theta 2o$.

In addition, in a fourth aspect of the invention, outer land portions on the axially outer sides of the outer circumferential main groove is divided into multiple circumferentially arranged outer blocks by multiple outer lateral grooves which extend axially outwardly from the outer circumferential main groove beyond the tread ground-contact end, and
  the outer lateral grooves include:
    a narrow-width part on the axially inner side and connecting to the outer circumferential main groove, and
    a wide-width part on the axially outer side and connecting to the tread ground-contact end, and
  a groove depth of the narrow-width part is smaller than a groove depth of the wide-width part.

In addition, in a fifth aspect of the invention, a groove centerline of the outer lateral groove is inclined at an angle β of 0 to 15° with respect to the axial line.

In addition, in a sixth aspect of the invention, there are the four circumferential main grooves, a center land portion is formed between the inner circumferential main grooves, and
  the center land portion includes center slots which extend from one inner circumferential main groove to a tire equatorial plane side and terminate without reaching other inner circumferential main groove.

In the present invention, an inner lateral groove is inclined at an angle α of 10° or larger with respect to an axial line. Thus, when a tire is grounded, the inner lateral groove is grounded gradually from one end side to the other end side in the axial direction. This s can reduce impact force from a road surface, thereby reducing a pitch sound. In addition, the angle α is controlled to be 40° or lower. Thus, of corner parts of an inner block which are formed at positions where the inner lateral groove intersects with the inner and outer circumferential main grooves, acute-angle-side corner parts are suppressed from being decreased excessively in rigidity. This can suppress uneven wear originating at an acute-angle-side corner part.

In addition, the inner lateral grooves consist of two types of grooves (first inner lateral grooves and second inner lateral grooves) with different groove shapes. Due to this, sound pressure of the pitch sound is dispersed and the pitch sound is reduced.

Yet, the first inner lateral groove includes a narrow-width part connecting to an inner circumferential main groove and a wide-width part connecting to an outer circumferential main groove. In the inner block, an axial inner part close to the tire equatorial plane is subjected to larger ground-contact pressure than an outer part. Thus, the inner part of the inner block is required to have relatively high rigidity. In contrast to this, the first inner lateral groove has a narrow-width part on an inner side of the axial direction. Thus, rigidity of the inner part of the inner block is relatively improved. As a result, rubber is restrained from moving and uneven wear is suppressed. In the narrow-width part, in particular, since a groove depth is also small, the uneven wear resistance on the inner block is more enhanced.

In addition, in rainy weather, since in the inner land portions, water is drained from the narrow-width part and wide-width part through the inner and outer circumferential main grooves, drainage is ensured. When water is deep, however, drainage performance may become insufficient on the axially inner side due to the narrow-width part. In the present invention, however, the second inner lateral grooves make up for insufficient drainage performance due to the narrow-width part. The second inner lateral grooves have widened parts on both sides of a constricted part. Then, an inner widened part thereof secures the drainage performance of the narrow-width part. In addition, in cooperation with the wide-width part of the first inner lateral groove, an outer widened part can increase an amount of drainage to the axially outer side which faces outwardly of a ground-contact surface, thereby enhancing wet performance.

DESCRIPTION OF THE PREFERRED EMBODIMENTS

In the following, embodiments of the present invention will be described in detail.

Figure 1:
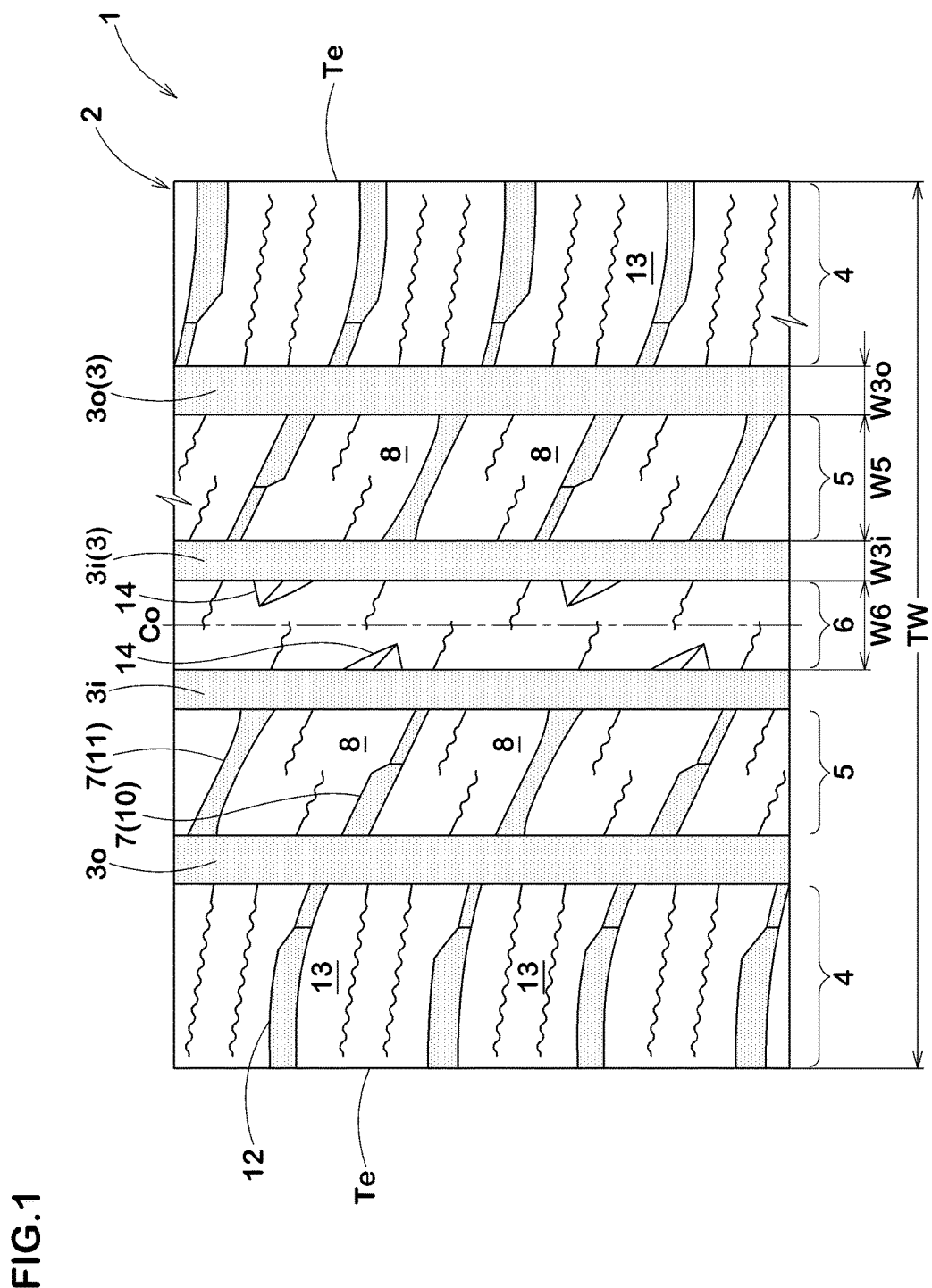
FIG. 1 is an expansion plan of a tread pattern showing one embodiment of a pneumatic tire of the present invention.

As shown in FIG. 1, a pneumatic tire 1 of this embodiment includes, in a tread portion 2, three or more circumferential main grooves 3 in total, including outer circumferential main grooves 3o disposed most on tread ground-contact end Te sides and inner circumferential main grooves 3i adjacent to the outer circumferential main grooves 3o axially inwardly. In this example, a total of four circumferential main grooves 3, i.e., a pair of the outer circumferential main grooves 3o and a pair of the inner circumferential main grooves 3i are disposed in the tread portion 2. This provides, in the tread portion 2, outer land portions 4 formed more outwardly in the axial direction than the outer circumferential main grooves 3o, inner land portions 5 formed between the inner and outer circumferential main grooves 3i, 3o, and a center land portion 6 formed between the inner circumferential main grooves 3i, 3i.

The circumferential main grooves 3 are formed as a straight groove linearly extending in a circumferential direction, from the standpoint of drainage performance and uneven wear resistance.

The circumferential main grooves 3 are wide grooves whose groove width is 0.07 times or more of a tread ground-contact width TW. From the standpoint of balancing of the drainage performance, it is preferable that a groove width w3o of the outer circumferential main grooves 3o is larger than a groove width w3i of the inner circumferential grooves 3i. specifically, it is preferable that the groove width w3i is in the range of 0.07 to 0.10 times of the tread ground-contact width TW and that the groove width w3o is in the range of 1.0 to 1.4 times of the groove width w3i. If the groove width w3i is less than 0.07 times of the tread ground-contact width TW, groove capacity is insufficient and the drainage performance is inadequate. To the contrary, if it exceeds 0.10 times, the groove capacity increases. This increases sound pressure in air column resonance, thereby leading to a disadvantage in pass-by noise. In addition, in the inner circumferential grooves 3i which are under larger ground-contact pressure, the sound pressure in the air column resonance is larger than that in the outer circumferential main groove 3o. Thus, when a ratio of the groove widths (w3o/w3i) falls below 1.0, the air column resonance sound from the inner circumferential main grooves 3i is large. To the contrary, when it exceeds 1.4, the air column resonance sound from the outer circumferential main grooves 3o is large. In any of the cases, the noise performance deteriorates.

The tread ground-contact width TW signifies maximum width of a ground-contact surface in the axial direction to be grounded when standard load is given to a tire in a state in which it is mounted around a standard rim and filled with standard inner pressure. In addition, the "standard rim" is a rim defined for each tire by a standard in a standard system including the standard on which the tire is based. For example, it means a normal rim in JATMA, "Design Rim" in TRA, and "Measuring Rim" in ETRTO. The "standard inner pressure" is an air pressure defined by the standard for each tire, and shall be a maximum air pressure in JATMA, a maximum value described in the table "TIRE LOAD LIMITS AT VARIOUS COLD INFLATION PRESSURES" in TRA, and "INFLATION PRESSURE" in ETRTO. It shall be 180 kPa in the case of a tire for a passenger vehicle. The "standard load" is load defined by the standard for each tire, and shall be maximum load capacity in JATMA, a maximum value described in the table "TIRE LOAD LIMITS AT VARIOUS COLD INFLATION PRESSURES" in TRA, and "LOAD CAPACITY" in ETRTO.

Next, in the inner land portions 5, multiple inner lateral grooves 7 traversing the inner land portions 5 are circumferentially provided at intervals. This divides the inner land portions 5 into multiple circumferentially arranged inner blocks 8. Specifically, the inner land portions 5 are formed as an array of inner blocks.

Figure 2:
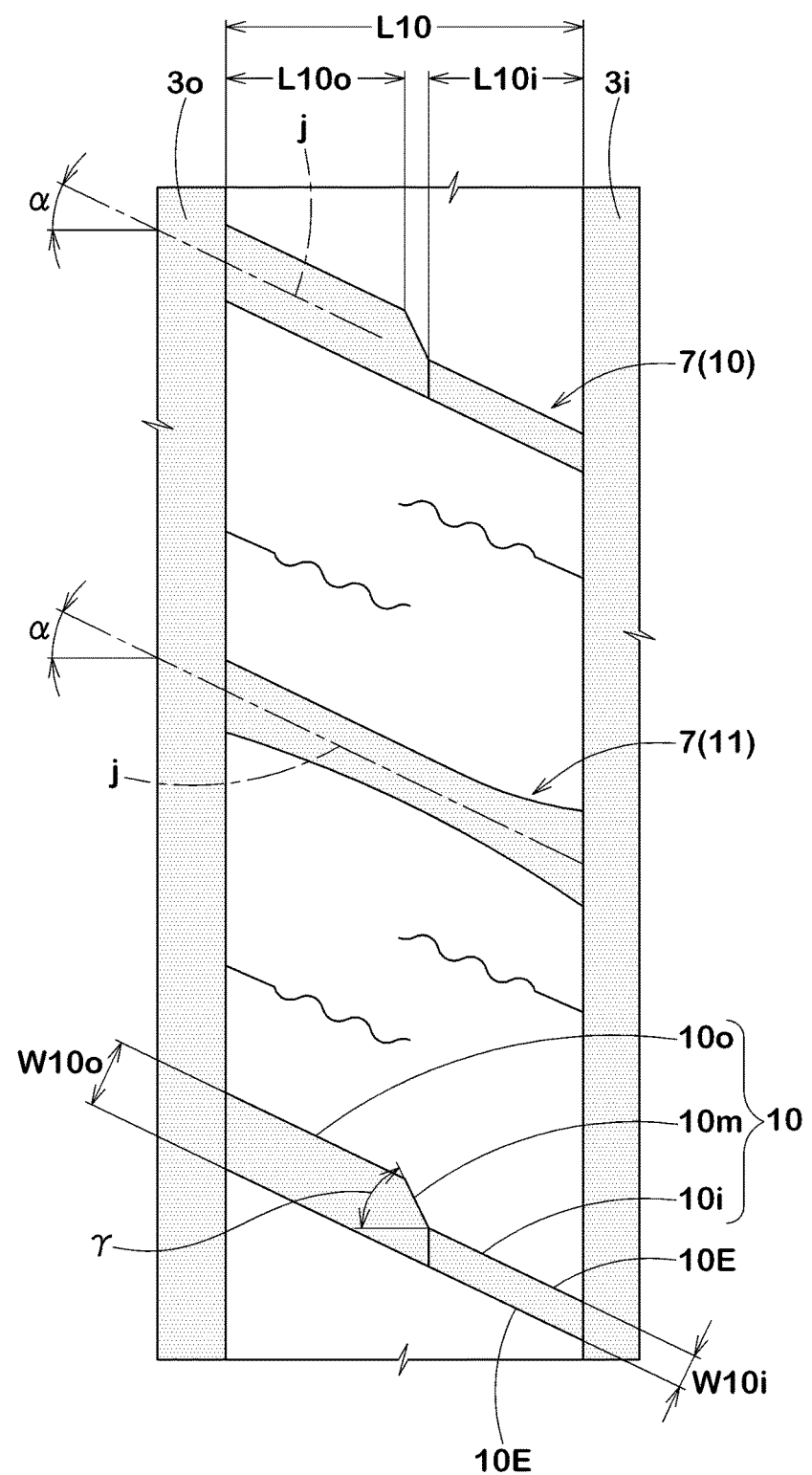
FIG. 2 is an enlarged view showing an inner land portion, together with inner lateral grooves.

As enlarged and shown in FIG. 2, the inner lateral grooves 7 consist of first inner lateral grooves 10 and second inner lateral grooves 11, which are arranged alternatively in the circumferential direction. Each of groove centerlines j in the first inner lateral grooves 10 and the second inner lateral grooves 11 is inclined at an angle α of 10 to 40° with respect to the axial line. If the groove centerline j is curved, its tangent line is inclined at the angle α.

The first inner lateral groove 10 includes a wide-width part 10o on the axially outer side and connecting to the outer circumferential main groove 3o and a narrow-width part 10i on the axially inner side and connecting to the inner circumferential main groove 3i. A ratio (w10i/w10o) of the groove width w10i of the narrow-width part 10i to the groove width w10o of the wide-width part 10o is preferably in the range of 0.4 to 0.6.

The first inner lateral groove 10 includes a transitional part 10m which connects the wide-width part 10o and the narrow-width part 10i. A groove width of the transitional part 10m gradually decreases toward the axial inner side from the wide-width part 10o to the narrow-width part 10i. However, the wide-width part 10o and the narrow-width part 10i may be directly connected in a step-like manner without providing the transitional part 10m. Note that the angle α is an angle α made by the groove centerline j of the wide-width part 10o and the narrow-width part 10i excluding the transitional part 10m.

In this example, one groove side edge 10E of groove side edges 10E on both sides of the first inner lateral groove 10 linearly extends at the angle α for its entire length. Thus, the other groove side edge 10E is inclined in a region of the transitional part 10m at an angle γ which is larger than the angle α. If the angle γ is too large, the groove width changes suddenly, affecting the uneven wear resistance. To the contrary, if the angle γ is too small, a ratio of the narrow-width part 10i and the wide-width part 10o to the first inner lateral groove 10 will decrease, and the first inner lateral groove 10 will become less effective. Therefore, the angle γ is preferably in the range of 75 to 85°.

Figure 3A:
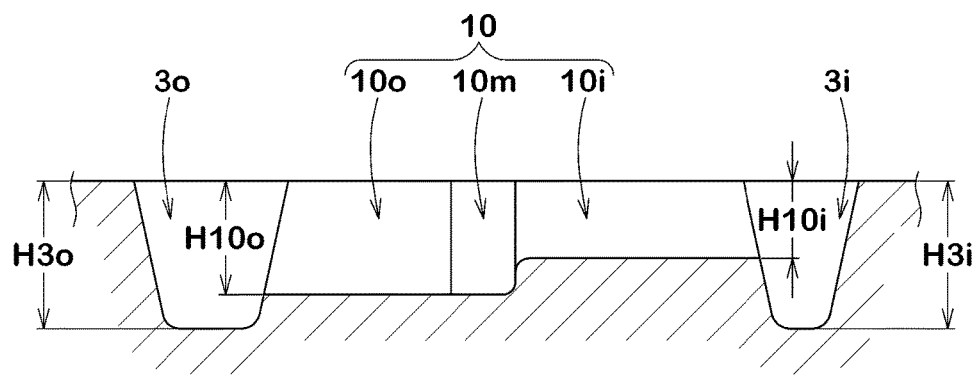
FIG. 3A is a cross sectional view showing depth of each part of the inner lateral groove.

It is preferable that an axial length L10i of the narrow-width part 10i is in the range of 0.4 to 0.6 times of axial entire length L10 of the first inner lateral groove 10. In addition, a ratio (L10i/L10o) of the length L10i of the narrow-width part 10i to the axial length L10o of the wide-width part 100 is preferably in the range of 0.75 to 0.95. in addition, as shown in FIG. 3A, in the first inner lateral groove 10, a groove depth H10i of the narrow-width part 10i is smaller than a groove depth H10o of the wide-width part 10o. Specifically, their ratio (H10i/H10o) is preferably in the range of 0.55 to 0.75. The example shows a case in which the transitional part 10m is also formed to have the same depth as the wide-width part 10o. However, the groove depth of the transitional part 10m may gradually increase from the narrow-width part 10i to the wide-width part 10o. Note that the groove depth H10i of the narrow-width part 10i is in the range of 0.4 to 0.7 times of a groove depth H3i of the inner circumferential main groove 3i. In addition, the inner circumferential main groove 3i and the outer circumferential main groove 3o are formed to have the same depth in this example.

Figure 4:
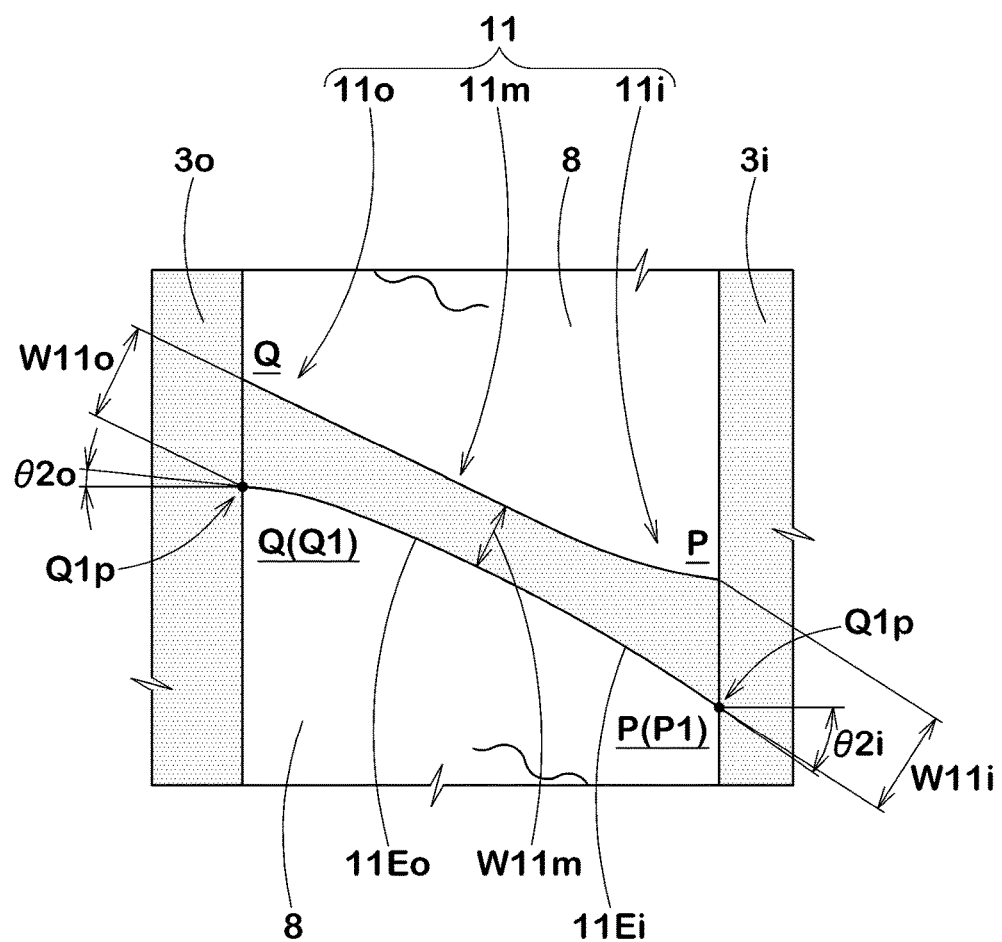
FIG. 4 is an enlarged view showing a second inner lateral groove.

As enlarged and shown in FIG. 4, the second inner lateral groove 11 has a constricted part 11m having a minimum groove width and being on a center side in a groove length direction, an outer widened part 11o whose groove width gradually increases from the constricted part 11m to the outer circumferential main groove 3o, and an inner widened part 11i whose groove width gradually increases from the constricted part 11m to the inner circumferential main groove 3i. The second inner lateral groove 11 has almost constant groove depth H11 (not shown) for its entire length. The "almost constant" contains the following cases in addition to the case in which the groove depth H11 is completely constant. Specifically, it contains a case in which a groove bottom face constitutes a smooth face with no step, and an error range is non-uniform, where a difference (H11max−H11min) between a maximum depth H11max and a minimum depth H11min is 10% or lower of the maximum depth H11max. The difference (H1max−H11min) is at least sufficiently smaller than a difference (H10o−H10i) between the groove depth H10i of the narrow-width part 10i and the groove depth H10o of the wide-width part 10o. In addition, it is preferable that the groove depth H11 of the second inner lateral groove 11 is substantially equal to the groove depth H10o of the wide-width part 10o.

In the second inner lateral groove 11, a circumferential groove width w11m of the constricted part 11m is larger than the groove width w10i of the narrow-width part 10i and smaller than the groove width w10o of the wide-width part 10o. In addition, it is preferable that opening widths w11i, w11o of the inner and outer widened parts 11i, 11o is in the range of 0.80 to 1.00 of the groove width w10o. Furthermore, it is more preferable to make the opening width w11i of the inner widened part 11i larger than the opening width w11o of the outer widened part 11o.

A corner part Q of the inner block 8 is formed at a position where the second inner lateral groove 11 intersects with the outer circumferential main groove 3o. The corner part Q has an acute-angle-side corner part Q1 and an obtuse-angle-side corner part Q2. On an acute-angle-side groove side edge 11Eo of the second inner lateral groove 11 which constitutes the acute-angle-side corner part Q1, a tangent line of the acute-angle-side groove side edge 11Eo at a tip Q1p of the corner part Q1 has an angle θ2o in the range of 0 to 10° with respect to the axial line. In addition, a corner part P of the inner block 8 is formed at a position where the second inner lateral groove 11 intersects with the inner circumferential main groove 3i. The corner part P has an acute-angle-side corner part P2 and an obtuse-angle-side corner part P1. On an obtuse-angle-side groove side edge 11Ei of the second inner lateral groove 11 which constitutes the obtuse-angle-side corner part P1, a tangent line of the obtuse-angle-side groove side edge 11Ei at a tip P1p of the corner part P1 has an angle θ2i with respect to the axial line which is larger than the angle θ2o.

As described above, in the tire 1 of the embodiment, the inner lateral grooves 7 formed in the inner land portions 5 are inclined at the angle α of 10° or larger. Thus, when the tire is grounded, the inner lateral grooves 7 are grounded gradually from one end side in the axial direction to the other end side. This can reduce impact force from a road surface, thereby reducing pitch sound. In addition, an upper limit of the angle α is controlled to be 40° or lower. Thus, of the corner parts Q of the inner block 8, the acute-angle-side corner part Q1 can be restrained from decreasing excessively in rigidity. This can suppress uneven wear originating at the corner part Q1. From such a standpoint, a lower limit of the angle α is preferably 15° or larger, or the upper limit is preferably 30° or lower.

In addition, the inner lateral grooves 7 consist of two types of grooves, namely, the first inner lateral grooves 10 and the second inner lateral grooves 11 which have different groove shapes. With this, sound pressure of the pitch sound due to the inner lateral grooves 7 can be dispersed and reduced, and thus the noise performance can be enhanced.

In addition, in the inner block 8, since an axial inner part close to the tire equatorial plane Co is subjected to larger ground-contact pressure than an outer part, the former is required to have relatively high rigidity. In contrast, in the first inner lateral groove 10, the narrow-width part 10i is provided axially inwardly to improve the rigidity relatively. Thus, rubber is restrained from moving and uneven wear is suppressed. In the narrow-width part 10i, in particular, groove depth H10i as well as groove width is small. Thus, the uneven wear resistance on the inner blocks 8 can be more enhanced.

In addition, as shown in this example, at the acute-angle-side corner part Q1 of the inner block 8, when the angle θ2o is controlled to be low in the range of 0 to 10°, the rigidity of the acute-angle-side corner part Q1 can be kept high. This can further suppress uneven wear originating at the corner part Q1. In addition, the angle θ2i at the obtuse-angle-side corner part P1 of the inner block 8 is made larger than the angle θ2o. Thus, reduction in a ground-contact area as a result of setting the angle θ2i to the range of 0 to 10° can be compensated and ground-contact performance can be ensured.

In addition, as for drainage performance, in rainy weather, water is drained in the inner land portion 5 from the narrow-width part 10i and the wide-width part 10o through the inner and outer circumferential main grooves 3i, 3o. Thus, drainage is ensured. When water is deep, however, drainage performance may become insufficient on the axially inner side due to the narrow-width part 10i. In the tire 1 of the present invention, however, the second inner lateral grooves 11 make up for insufficient drainage performance due to the narrow-width part 10i. The second inner lateral grooves 11 have widened parts 11i, 11o on both sides of a constricted part 11m. Then, the inner widened part 11i thereof secures the drainage performance of the narrow-width part 10i. In addition, in cooperation with the wide-width part 10o of the first inner lateral groove 10, an outer widened part 11o can increase an amount of drainage to the outer side of the axial direction which faces outwardly of a ground-contact surface, thereby enabling enhancement of wet performance.

Now, in the first inner lateral groove 10, when the ratio (w10i/w10o) of the groove width w10i of the narrow-width part 10i to the groove width w10o of the wide-width part 10o is less than 0.4, the drainage performance from the narrow-width part 10i deteriorates. To the contrary, when the ratio exceeds 0.6, there is a tendency that block rigidity becomes insufficient and thus enhancement of the uneven wear resistance is not achieved adequately. Similarly, when a ratio (H10i/H10o) of the groove depth H10i of the narrow-width part 10i to the groove depth H10o of the wide-width part 10o is less than 0.55, drainage performance from the narrow-width part 10i deteriorates. To the contrary, when the ratio exceeds 0.75, there is a tendency that the block rigidity becomes insufficient and thus enhancement of the uneven wear resistance is not achieved adequately. In addition, when the groove depth H10i of the narrow-width part 10i is less than 0.4 times of the groove depth H3i of the inner circumferential main groove 3i, the drainage performance from the narrow-width part 10i deteriorates. To the contrary, when it exceeds 0.7 times, there is a tendency that the block rigidity becomes insufficient and thus enhancement of the uneven wear resistance is not achieved adequately.

In addition, when the length L10i of the narrow-width part 10i is less than 0.4 times of the total length L10 of the first inner lateral groove 10, there is a tendency that the block rigidity becomes insufficient and enhancement of uneven wear resistance is not achieved adequately. To the contrary, when it exceeds 0.6 times, there is a tendency that the drainage performance from the narrow-width part 10i deteriorates. In addition, when a ratio (L10i/L10o) of the length L10i of the narrow-width part 10i to the length L10o of the wide-width part 10o is less than 0.75, there is a tendency that the block rigidity becomes insufficient and enhancement of the uneven wear resistance is not achieved adequately. To the contrary, if it exceeds 0.95, there is a tendency that the drainage performance from the narrow-width part 10i deteriorates.

In addition, in the second inner lateral groove 11, when the groove width w11m of the constricted part 11m is equal to or smaller than the groove width w10i of the narrow-width part 10i, it becomes difficult to make up for insufficient drainage due to the narrow-width part 10i. To the contrary, when it is equal to or larger than the groove width w10o of the wide-width part 10o, the block rigidity becomes insufficient and enhancement of the uneven wear resistance cannot be achieved adequately. In addition, when the opening width w11i, w11o of the inner and outer widened parts 11i, 11o is less than 0.80 times of the groove width w10o, it becomes difficult to make up for insufficient drainage due to the narrow-width part 10i. To the contrary, if it exceeds 1.0 times, the block rigidity becomes insufficient and enhancement of uneven wear resistance cannot be achieved adequately. Note that in order to make up for insufficient drainage due to the narrow-width part 10i, it is more preferable to make the opening width w11i of the inner widened part 11i larger than the opening width w11o of the outer widened part 11o.

Figure 5:
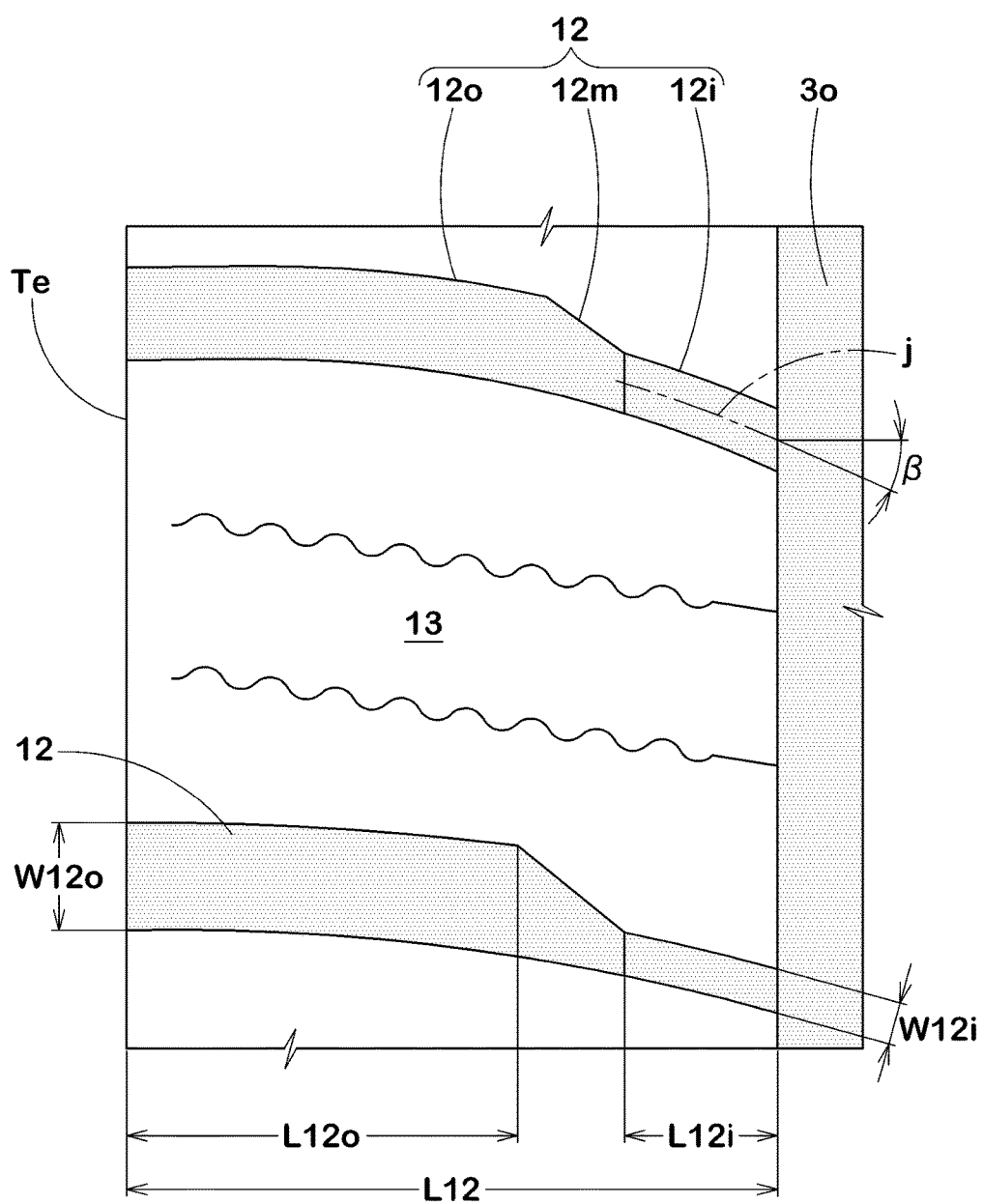
FIG. 5 is an enlarged view showing an outer land portion, together with outer lateral grooves.

Next, as enlarged and shown in FIG. 5, in the outer land portions 4, multiple outer lateral grooves 12 traversing the outer land portions 4 are circumferentially provided at intervals. This divides the outer land portions 4 into multiple circumferentially arranged outer blocks 13. Specifically, the outer land portions 4 are formed as an array of the outer blocks.

In this example, the groove centerline j of the outer lateral groove 12 is inclined at an angle β of 0 to 15° with respect to the axial line, which is smaller than the angle α of the inner lateral grooves 7. When the groove centerline j is curved, its tangent line is inclined at the angle β. In addition, the outer lateral groove 12 forms a groove configuration similar to the first inner lateral groove 10. To be specific, the outer lateral groove 12 is configured to include a narrow-width part 12i on the axially inner side and connecting to the outer circumferential main groove 3o, and a wide-width part 12o on the axially outer side and connecting to the tread ground-contact end Te. It is preferable that a ratio (w12i/w12o) of a groove width w12i of the narrow-width part 12i to a groove width w12o of the wide-width part 12o is in the range of 0.4 to 0.6.

Similarly to the first inner lateral groove 10, the outer lateral groove 12 in the example includes a transitional part 12m which connects the wide-width part 12o and the narrow-width part 12i. A groove width of the transitional part 12m gradually decreases toward the axial inner side from the wide-width part 12o to the narrow-width part 12i. However, the wide-width part 12o and the narrow-width part 12i may be directly connected in a step-like manner without providing the transitional part 12m. Note that the angle β is an angle made by the groove centerline j of the wide-width part 12o and the narrow-width part 12i excluding the transitional part 12m.

In addition, in the outer lateral groove 12, one groove side edge 12E of the groove side edges 12E on both sides thereof smoothly extends at the angle β for its entire length. Thus, other groove side edge 12E is inclined at an angle which is larger than the angle β in a region of the transitional part 12m.

Figure 3B:
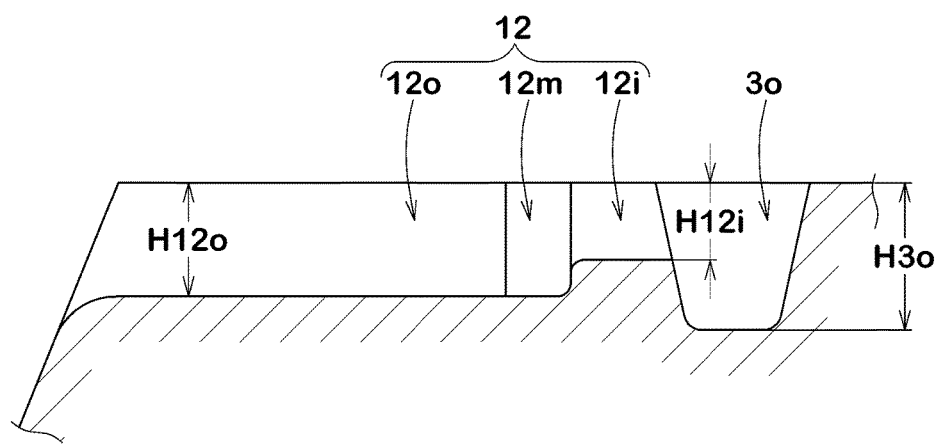
FIG. 3B is a cross sectional view showing depth of each part of the outer lateral groove.

It is preferable that the axial length L12i of the narrow-width part 12i is in the range of 0.1 to 0.4 times of the axial entire length L12 of the outer lateral groove 12. In addition, a ratio (L12i/L12o) of the length L12i of the narrow-width part 12i to the axial length L12o of the wide-width part 12o is preferably in the range of 0.30 to 0.50. in addition, as shown in FIG. 3B, in the outer lateral groove 12, a groove depth H12i of the narrow-width part 12i is smaller than a groove depth H12o of the wide-width part 12o. Specifically, a ratio thereof (H12i/H12o) is more preferably in the range of 0.55 to 0.75.

The example shows a case in which the transitional part 12m is formed to have same depth as that of the wide-width part 12o. However, the groove width of the transitional part 12m may gradually increase from the narrow-width part 12i to the wide-width part 12o. In addition, the groove depth H12i of the narrow-width part 12i is preferably in the range of 0.4 to 0.7 times of the groove depth H3o of the outer circumferential main groove 3o.

Since in the outer land portions 4, the ground-contact pressure is lower than the inner land portions 5, the former contributes less to the pitch sound. Thus, by making the angle β in the outer land portion 4 smaller than the angle α in the inner land portion 5, rigidity at the acute-angle-side corner part Q1 of the outer block 13 is improved while keeping degradation of the pitch sound low. This can suppress uneven wear in the outer block 13 which originates at the corner part Q1.

Note that when the ratio (w12i/w12o) of the groove width w12i of the narrow-width part 12i to the groove width w12o of the wide-width part 12o is less than 0.4, the drainage performance from the narrow-width part 12i deteriorates. To the contrary, when it exceeds 0.6, there is a tendency that the block rigidity becomes insufficient and enhancement of the uneven wear resistance is not achieved adequately. Similarly, when the ratio (H12i/H12o) of the groove depth H12i of the narrow-width part 12i to the groove depth H12o of the wide-width part 12o is less than 0.55, the drainage performance from the narrow-width part 12i deteriorates. To the contrary, when it exceeds 0.75, there is a tendency that the block rigidity becomes insufficient and enhancement of the uneven wear resistance is not achieved adequately. In addition, when the groove depth H12i of the narrow-width part 12i is less than 0.4 times of the groove depth H3o of the outer circumferential main groove 3o, the drainage performance from the narrow-width part 12i deteriorates. To the contrary, when it exceeds 0.7 times, there is a tendency that the block rigidity becomes insufficient and enhancement of the uneven wear resistance is not achieved adequately. In addition, when the length L12i of the narrow-width part 12i is less than 0.1 times of the entire length L12 of the outer lateral groove 12, there is a tendency that the block rigidity becomes insufficient and enhancement of the uneven wear resistance is not achieved adequately. To the contrary, if when exceeds 0.4 times, there is a tendency that the drainage performance from the narrow-width part 12i deteriorates.

Next, as shown in FIG. 1, in the center land portion 6 are formed center slots 14 which extend from one inner circumferential main groove 3i to a tire equatorial plane Co side and terminate without reaching the other inner circumferential main groove 3i, preferably, without traversing the tire equatorial plane Co. The center slots 14 improve the drainage performance of the center land portion 6, while suppressing reduction in the rigidity in the center land portion 6. The center slots 14 also agitate air flow in the inner circumferential main groove 3i. Thus, they can contribute to the noise performance by preventing formation of air column in the inner circumferential main groove 3i.

It is preferable that land portion width w6 of the center land portion 6 is in the range of 0.5 to 0.8 times of land portion width w5 of the inner 1 and portions 5. If it falls below 0.5 times, rigidity of the center land portion 6 excessively drops relative to rigidity of the inner land portions. Thus, so-called center wear (uneven wear) where the center land portion 6 abrades early occurs. To the contrary, when it exceeds 0.8 times, the rigidity of the center land potion 6 becomes unreasonable. With this, a response to steering in neutral becomes excessive, resulting in reduced steering stability.

Figure 6:
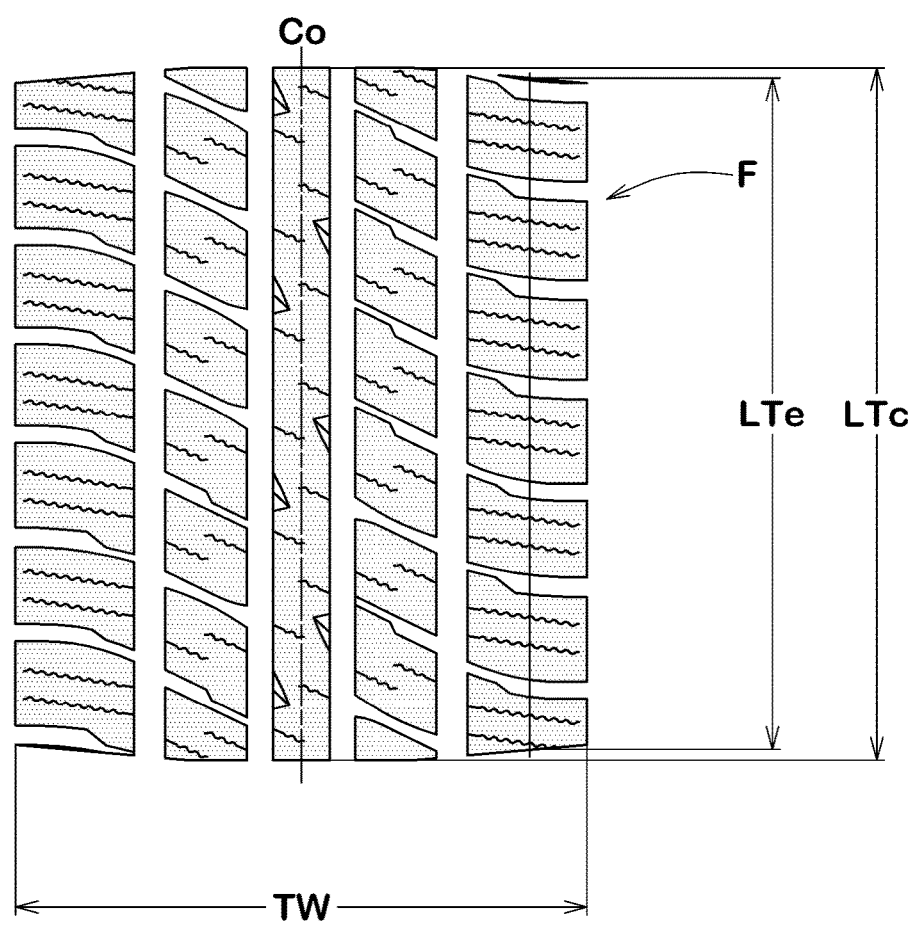
FIG. 6 is a plan view showing a ground-contact plane shape of a tire.

In addition, FIG. 6 shows a shape F of a ground-contact surface of a tread surface which makes contact with the ground when standard load is given to a tire in a state in which it is mounted around a standard rim and filled with standard inner pressure. For the tire in the example, in the ground-contact surface shape F, ground-contact length LTc at the tire equatorial plane Co is in the range of 1.10 to 1.25 times of ground-contact length ate at a position spaced axially outwardly for a distance which is 0.4 times of ground-contact width TW from the tire equatorial plane Co. When the ground-contact length LTc is out of this range, a balance of the ground-contact pressure is lowered, which adversely affects the uneven wear resistance.

For the pneumatic tire 1, as shown in this example, a case in which the number of the circumferential main grooves 3 is four in total is most preferred from the standpoint of the balance between the tread rigidity and drainage performance. Nevertheless, the number of the circumferential main grooves 3 may be three, five, or six, for example. Note that, in a case in which the number of the circumferential main grooves 3 is three in total, the number of the inner circumferential main groove 3i is one. In addition, when a total number of the circumferential main grooves 3 is five to six, one or two center circumferential main grooves are formed between the inner circumferential main grooves 3i, 3i.

So far particularly preferred embodiments of the present invention have been described in detail. However, the present invention is not limited to the embodiments as shown, and may be performed as various modifications.

EXAMPLES

Figure 7:
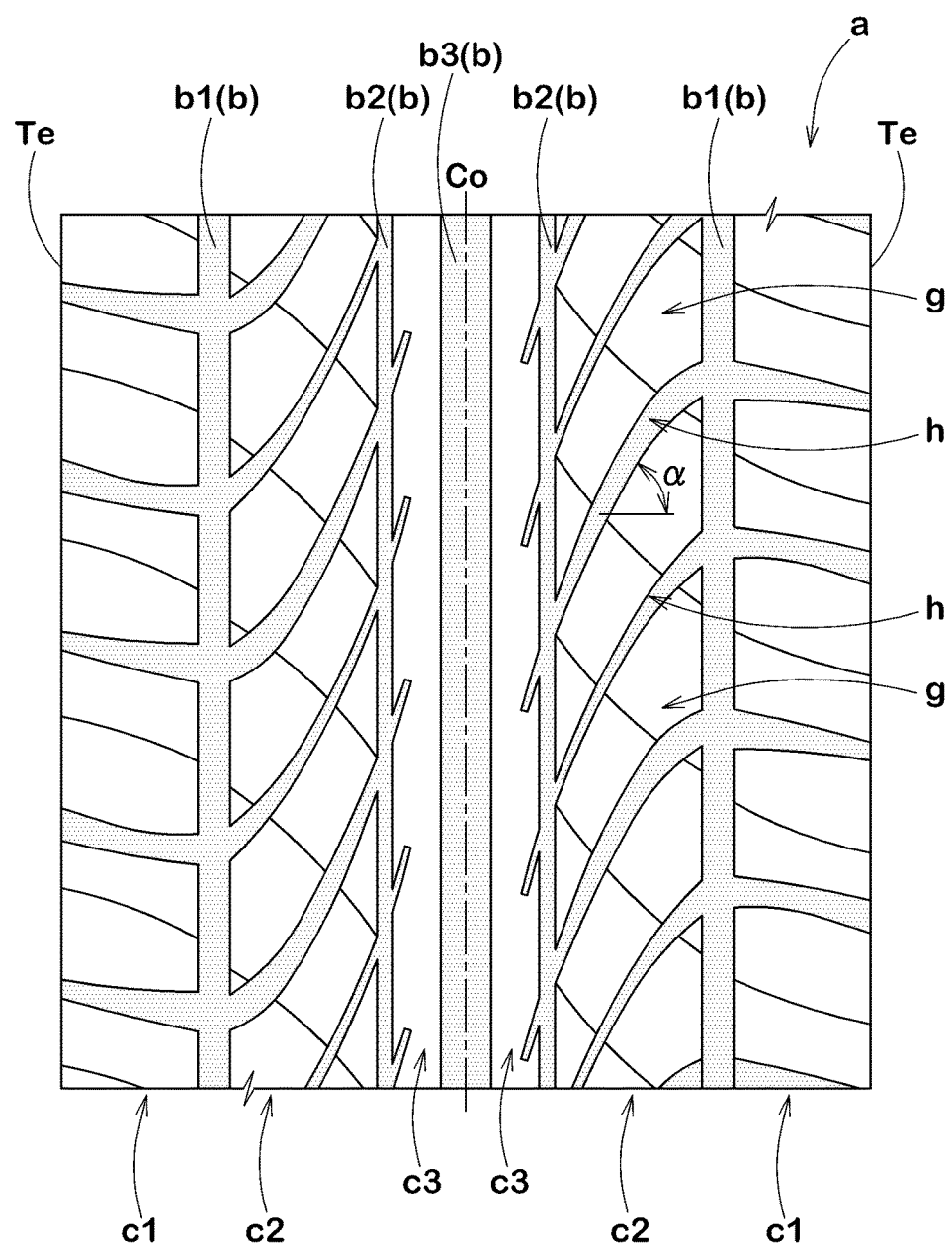
FIG. 7 is an expansion plan showing one example of a tread pattern of a conventional tire.

Tires with a size of 265/70R16 having the tread pattern in FIG. 1 as a basic pattern were prototyped according to the specifications in Table 1. The noise performance, wet performance, and uneven wear resistance was tested and evaluated for each sample tire. Note that comparisons were made with a tire having the tread pattern in FIG. 7 as a comparative example 5. Except the specifications listed in Table 1, the tires had substantially identical specifications. Shown below are common specifications:

Groove width w3*i* of the inner circumferential main grooves=9 mm, groove depth H3*i*=9.5 mm Groove width w3*o* of the outer circumferential main grooves=11 mm, groove depth H3*o*=9.5 mm Land portion width W6 of the center land portion=20 mm Land portion with W5 of the inner land portions=29 mm Tread ground-contact width TW=202 mm (1) Noise Performance A sample tire was mounted on all wheels of a vehicle (SUV vehicle, 4000 cc) with a rim (7.0 JJ) and internal pressure (200 kPa). The vehicle was coasted on a straight test course in accordance with the actual vehicle coasting test specified in JASO C606 at a passing speed of 60 km/H. Then, maximum pass-by sound level dB (A) was measured by an installed microphone placed at a position which is spaced 7.5 m laterally from a driving centerline at a midpoint of the course and which is located at the height of 1.2 m from a test road surface. Then, noise (hissing sound) around the frequencies of 800 Hz that is heard as "hissing" sound caused by air column resonance of the circumferential grooves and pitch sound around the frequencies of 630 Hz caused by the grooves in the axial direction were evaluated with an index of 100 representing a value in comparative example 1. The higher a numeric value is, the better the noise performance is.

(2) Wet Performance

The inside drum tester was used. A driving test was performed on wet asphalt road surface (water depth of 3.0 mm) with a rim (7.0 JJ), an internal pressure (200 kPa), a load (5.19 kN), and a slip angle of 1°. Then, the speed at which hydroplaning occurred was evaluated with an index of 100 representing a value in comparative example 1. The higher a numeric value is, the better the wet performance is.

(3) Uneven Wear Resistance

The vehicle used in the noise performance test was actually driven for 20000 km, and then, amounts of heel and toe wear which occurs in the inner block were measured, and evaluated with an index of 100 representing a value in comparative example 1. The higher a numeric value is, the better the uneven wear resistance is.

TABLE 1

| | Comparative example 1 | Comparative example 2 | Comparative example 3 | Example 1 | Example 2 | Example 3 | Comparative example 4 | Example 4 | Example 5 | Example 6 | Example 7 |
|---|---|---|---|---|---|---|---|---|---|---|---|
| <Inner lateral groove> | | | | | | | | | | | |
| Angle α (degrees) | 0 | 25 | 5 | 10 | 25 | 40 | 50 | | 25 | | |
| First inner lateral groove | (Constant width) | Present | | | | Present | Present | | | | |
| Wide-width part | | | | | | | | | | | |
| Groove width W10o (mm) | 6 | 5.5 | 5.9 | 5.8 | 5.5 | 4 | 3.5 | | 5.5 | | |
| Groove length L10o (mm) | | | | | | 14.0 | | | | | |
| Groove depth H10o (mm) | | | | | | 8.5 | | | | | |
| Narrow-width part | None | | | | | | Present | | | | |
| Groove width W10i/W10o | — | | | | 0.5 | | 0.65 | 0.4 | 0.6 | 0.75 | 0.95 |
| Groove length L10i/L10o | — | | | | | 0.85 | 0.5 | | | | |
| Groove depth H10i/H10o | — | | | | | | 0.6 | | | | |
| Ratio L10/L10 | — | | | | | | | | | | |
| Ratio H10/H3i | — | | | | | | | | | | |
| Second inner lateral groove | | | | | | | Present | | | | |
| Constricted part | | | | | | | Present | | | | |
| Groove width W11m (mm) | | | | | | | 4.0 | | | | |
| Inner widened part | | | | | | | Present | | | | |
| Opening width W11i (mm) | | | | | | | 6.0 | | | | |
| Outer widened part | | | | | | | Present | | | | |
| Opening width W11o (mm) | | | | | | | 5.0 | | | | |
| Angle θ2o (degrees) | (Constant width) | | | | | | 5 | | | | |
| <Outer lateral groove> | | | | | | | | | | | |
| Angle β (degrees) | 0 | | | | | | 9 | | | | |
| Wide-width part | | | | | | Present | Present | | | | |
| Groove width W12o (mm) | | | | | | 7.0 | | | | | |
| Groove length L12o (mm) | | | | | | 2.5 | | | | | |
| Groove depth H12o (mm) | | | | | | 8.5 | | | | | |
| Narrow-width part | None | | | | | | Present | | | | |
| Groove width W12i/W12o | — | | | | | | 0.5 | | | | |
| Groove length L12i/L12o | — | | | | | | 0.4 | | | | |
| Groove depth H12i/H12o | — | | | | | | 0.62 | | | | |
| Ratio L12i/L12 | — | | | | | | 0.25 | | | | |
| Ratio H12i/H3o | — | | | | | | 0.55 | | | | |
| Noise performance | | | | | | | | | | | |
| Hissing sound | 100 | 102 | 105 | 105 | 105 | 105 | 105 | 105 | 105 | 105 | 105 |
| Pitch sound | 100 | 105 | 106 | 108 | 110 | 111 | 112 | 109 | 111 | 111 | 109 |
| Wet performance | 100 | 100 | 100 | 100 | 100 | 100 | 100 | 100 | 100 | 100 | 100 |
| Uneven wear resistance | 100 | 105 | 111 | 110 | 110 | 109 | 100 | 111 | 109 | 109 | 111 |
| | | | Comparative | | | | | | | | Comparative |

TABLE 1-continued

| | Example 8 | Example 9 | Example 10 | Example 11 | Example 12 | Example 13 | example 5 |
|---|---|---|---|---|---|---|---|
| <Inner lateral groove> | | | | | | | |
| Angle α (degrees) | | | 25 | | | | 40 to 70 |
| First inner lateral groove | | | Present | Present | | | Present (Curvature) |
| Wide-width part | | | | | | | |
| Groove width W10o (mm) | | | 5.5 | | | | 2 to 4 |
| Groove length L10o (mm) | | | 14.0 | | | | — |
| Groove depth H10o (mm) | | | | 8.5 | | | |
| Narrow-width part | | | Present | | | | None |
| Groove width W10i/W10o | | | 0.5 | | | | — |
| Groove length L10i/L10o | | | 0.85 | | | | — |
| Groove depth H10i/H10o | | 0.5 | | | 0.65 | | — |
| Ratio L10i/L10 | 0.55 | 0.75 | | | | | — |
| Ratio H10i/H3i | | 0.6 | 0.4 | 0.6 | 0.4 | 0.7 | None |
| Second inner lateral groove | | | Present | | | | — |
| Constricted part | | | Present | | | | — |
| Groove width W11m (mm) | | | 4.0 | | | | — |
| Inner widened part | | | Present | | | | — |
| Opening width W11i (mm) | | | 6.0 | | | | — |
| Outer widened part | | | Present | | | | — |
| Opening width W11o (mm) | | | 5.0 | | | | — |
| Angle θ2o (degrees) | | | 5 | | | | — |
| <Outer lateral groove> | | | | | | | |
| Angle β (degrees) | | | 9 | | | | 0 |
| Wide-width part | | | Present | | | | Present |
| Groove width W12o (mm) | | | | 7.0 | | | |
| Groove length L12o (m) | | | | 2.5 | | | |
| Groove depth H12o (mm) | | | | 8.5 | | | |
| Narrow-width part | | | Present | | | | None |
| Groove width W12i/W12o | | | 0.5 | | | | — |
| Groove length L12i/L12o | | | 0.4 | | | | — |
| Ratio L12i/L12 | | | 0.62 | | | | — |
| Ratio H12i/H3o | | | 0.25 | | 0.5 | | — |
| Noise performance | | | 0.55 | | | | — |
| Missing sound | 106 | 104 | 105 | 105 | 105 | 105 | 105 |
| Pitch sound | 109 | 109 | 111 | 109 | 109 | 111 | 95 |
| Wet performance | 99 | 100 | 102 | 98 | 98 | 102 | 90 |
| Uneven wear resistance | 111 | 109 | 109 | 111 | 111 | 109 | 105 |

TABLE 2

|  | Example 14 | Example 15 | Example 16 | Example 17 | Example 18 | Example 19 | Example 20 |
|---|---|---|---|---|---|---|---|
| <Inner lateral groove> | | | | | | | |
| Angle α (degrees) | 25 | 25 | 25 | 25 | 25 | 25 | 25 |
| First inner lateral groove | Present | Present | Present | Present | Present | Present | Present |
| Wide-width part | Present | Present | Present | Present | Present | Present | Present |
| Groove width W10o (mm) | 5.5 | 5.5 | 5.5 | 5.5 | 5.5 | 5.5 | 5.5 |
| Groove length L10o (mm) | 14.0 | 14.0 | 14.0 | 14.0 | 14.0 | 14.0 | 14.0 |
| Groove depth H10o (mm) | 8.5 | 8.5 | 8.5 | 8.5 | 8.5 | 8.5 | 8.5 |
| Narrow-width part | Present | Present | Present | Present | Present | Present | Present |
| Groove width W10i/W10o | 0.5 | 0.5 | 0.5 | 0.5 | 0.5 | 0.5 | 0.5 |
| Groove length L10i/L10o | 0.85 | 0.85 | 0.85 | 0.85 | 0.85 | 0.85 | 0.85 |
| Groove depth H10i/H10o | 0.65 | 0.65 | 0.65 | 0.65 | 0.65 | 0.65 | 0.65 |
| Ratio L10i/L10 | 0.5 | 0.5 | 0.5 | 0.5 | 0.5 | 0.5 | 0.5 |
| Ratio H10i/H3i | 0.6 | 0.6 | 0.6 | 0.6 | 0.6 | 0.6 | 0.6 |
| Second inner lateral groove | Present | Present | Present | Present | Present | Present | Present |
| Constricted part | Present | Present | Present | Present | Present | Present | Present |
| Groove width W11m (mm) | 4.0 | 4.0 | 4.0 | 4.0 | 4.0 | 4.0 | 4.0 |
| Inner widened part | Present | Present | Present | Present | Present | Present | Present |
| Opening width W11i (mm) | 6.0 | 6.0 | 6.0 | 6.0 | 6.0 | 6.0 | 6.0 |
| Outer widened part | Present | Present | Present | Present | Present | Present | Present |
| Opening width W11o (mm) | 5.0 | 5.0 | 5.0 | 5.0 | 5.0 | 5.0 | 5.0 |
| Angle θ2o (degrees) | 0 | 10 | 5 | 5 | 5 | 5 | 5 |
| <Outer lateral groove> | Present | Present | Present | Present | Present | Present | Present |
| Angle β (degrees) | 9 | 9 | 0 | 15 | 9 | 9 | 9 |
| Wide-width part | Present | Present | Present | Present | Present | Present | Present |
| Groove width W12o (mm) | 7.0 | 7.0 | 7.0 | 7.0 | 7.0 | 7.0 | 7.0 |
| Groove length L12o (mm) | 2.5 | 2.5 | 2.5 | 2.5 | 2.5 | 2.5 | 2.5 |
| Groove depth H12o (mm) | 8.5 | 8.5 | 8.5 | 8.5 | 8.5 | 8.5 | 8.5 |
| Narrow-width part | Present | Present | Present | Present | Present | Present | Present |
| Groove width W12i/W12o | 0.5 | 0.5 | 0.5 | 0.5 | 0.4 | 0.6 | 0.5 |
| Groove length L12i/L12o | 0.4 | 0.4 | 0.4 | 0.4 | 0.4 | 0.4 | 0.3 |
| Groove depth H12i/H12o | 0.62 | 0.62 | 0.62 | 0.62 | 0.62 | 0.62 | 0.62 |
| Ratio L12i/L12 | 0.25 | 0.25 | 0.25 | 0.25 | 0.25 | 0.25 | 0.25 |
| Ratio H12i/H3o | 0.55 | 0.55 | 0.55 | 0.55 | 0.55 | 0.55 | 0.55 |
| Noise performance | | | | | | | |
| Hissing sound | 105 | 105 | 105 | 105 | 105 | 105 | 105 |
| Pitch sound | 109 | 111 | 108 | 112 | 109 | 111 | 110 |
| Wet performance | 100 | 100 | 100 | 100 | 100 | 100 | 100 |
| Uneven wear resistance | 111 | 109 | 111 | 108 | 111 | 109 | 110 |

|  | Example 21 | Example 22 | Example 23 | Example 24 | Example 25 | Example 26 | Example 27 |
|---|---|---|---|---|---|---|---|
| <Inner lateral groove> | | | | | | | |
| Angle α (degrees) | 25 | 25 | 25 | 25 | 25 | 25 | 25 |
| First inner lateral groove | Present | Present | Present | Present | Present | Present | Present |
| Wide-width part | Present | Present | Present | Present | Present | Present | Present |
| Groove width W10o (mm) | 5.5 | 5.5 | 5.5 | 5.5 | 5.5 | 5.5 | 5.5 |
| Groove length L10o (mm) | 14.0 | 14.0 | 14.0 | 14.0 | 14.0 | 14.0 | 14.0 |
| Groove depth H10o (mm) | 8.5 | 8.5 | 8.5 | 8.5 | 8.5 | 8.5 | 8.5 |
| Narrow-width part | Present | Present | Present | Present | Present | Present | Present |
| Groove width W10i/W10o | 0.5 | 0.5 | 0.5 | 0.5 | 0.5 | 0.5 | 0.5 |
| Groove length L10i/L10o | 0.85 | 0.85 | 0.85 | 0.85 | 0.85 | 0.85 | 0.85 |
| Groove depth H10i/H10o | 0.65 | 0.65 | 0.65 | 0.65 | 0.65 | 0.65 | 0.65 |
| Ratio L10i/L10 | 0.5 | 0.5 | 0.5 | 0.5 | 0.5 | 0.5 | 0.5 |
| Ratio H10i/H3i | 0.6 | 0.6 | 0.6 | 0.6 | 0.6 | 0.6 | 0.6 |
| Second inner lateral groove | Present | Present | Present | Present | Present | Present | Present |
| Constricted part | Present | Present | Present | Present | Present | Present | Present |
| Groove width W11m (mm) | 4.0 | 4.0 | 4.0 | 4.0 | 4.0 | 4.0 | 4.0 |
| Inner widened part | Present | Present | Present | Present | Present | Present | Present |
| Opening width W11i (mm) | 6.0 | 6.0 | 6.0 | 6.0 | 6.0 | 6.0 | 6.0 |
| Outer widened part | Present | Present | Present | Present | Present | Present | Present |
| Opening width W11o (mm) | 5.0 | 5.0 | 5.0 | 5.0 | 5.0 | 5.0 | 5.0 |
| Angle θ2o (degrees) | 5 | 5 | 5 | 5 | 5 | 5 | 5 |
| <Outer lateral groove> | Present | Present | Present | Present | Present | Present | Present |
| Angle β (degrees) | 9 | 9 | 9 | 9 | 9 | 9 | 9 |
| Wide-width part | Present | Present | Present | Present | Present | Present | Present |
| Groove width W12o (mm) | 7.0 | 7.0 | 7.0 | 7.0 | 7.0 | 7.0 | 7.0 |
| Groove length L12o (mm) | 2.5 | 2.5 | 2.5 | 2.5 | 2.5 | 2.5 | 2.5 |
| Groove depth H12o (mm) | 8.5 | 8.5 | 8.5 | 8.5 | 8.5 | 8.5 | 8.5 |
| Narrow-width part | Present | Present | Present | Present | Present | Present | Present |
| Groove width W12i/W12o | 0.5 | 0.5 | 0.5 | 0.5 | 0.5 | 0.5 | 0.5 |
| Groove length L12i/L12o | 0.5 | 0.5 | 0.5 | 0.4 | 0.5 | 0.5 | 0.5 |
| Groove depth H12i/H12o | 0.62 | 0.55 | 0.75 | 0.62 | 0.62 | 0.62 | 0.62 |
| Ratio L12i/L12 | 0.25 | 0.25 | 0.1 | 0.4 | 0.4 | 0.25 | 0.25 |
| Ratio H12i/H3o | 0.55 | 0.55 | 0.55 | 0.55 | 0.55 | 0.4 | 0.7 |

TABLE 2-continued

| Noise performance | | | | | | | |
|---|---|---|---|---|---|---|---|
| Hissing sound | 105 | 105 | 105 | 105 | 105 | 105 | 105 |
| Pitch sound | 108 | 108 | 112 | 112 | 108 | 108 | 112 |
| Wet performance | 100 | 100 | 100 | 100 | 100 | 100 | 100 |
| Uneven wear resistance | 112 | 112 | 108 | 108 | 112 | 112 | 108 |

As shown in the tables, it can be confirmed that the tires of the examples can enhance the uneven wear resistance and noise performance without degrading the drainage performance.

DESCRIPTION OF SYMBOLS

1: Pneumatic tire
2: Tread portion
3: circumferential main groove
3o: Outer circumferential main groove
3i: Inner circumferential main groove
4: Outer land portion
5: Inner land portion
6: Center land portion
7: Inner lateral groove
8: Inner block
10: First inner lateral groove
10i: Narrow-width part
10o: wide-width part
11: Second inner lateral groove
11i: Inner widened part
11m: constricted part
11o: outer widened part
12: outer lateral groove
12i: Narrow-width part
12o: wide-width part
12E1: Acute-angle-side groove side edge
12E2: obtuse-angle-side groove side edge
13: Outer block
14: center slot
j: Groove centerline
P, Q: Corner part
P1p, Q1p: Tip of corner part
P1: obtuse-angle-side corner part
Q1: Acute-angle-side corner part
Te: Tread ground-contact end

What is claimed is:

1. A pneumatic tire comprising three or more circumferential main grooves in a tread portion, including outer circumferential main grooves disposed most on tread ground-contact end sides and at least one inner circumferential main groove adjacent to the outer circumferential main grooves axially inwardly in the tread portion, wherein
inner land portions disposed between the inner and outer circumferential main grooves are divided into multiple circumferentially arranged inner blocks by multiple inner lateral grooves traversing the inner land portions,
a groove centerline of the inner lateral grooves is inclined at an angle α of 10 to 40° with respect to an axial line,
the inner lateral grooves include first inner lateral grooves and second inner lateral grooves which are alternately arranged in a circumferential direction,
the first inner lateral grooves include:
a wide-width part on an axially outer side and connecting to the outer circumferential main groove,
a narrow-width part on an axially inner side and connecting to the inner circumferential main groove, and
a transitional part connecting the wide-width part and the narrow-width part, and of which groove width gradually decreasing toward the axial inner side from the wide-width part to the narrow-width part,
a ratio (L10i/L10o) of an axial length (L10i) of the narrow-width part to an axial length (L10o) of the wide-width part is 0.75 to 0.95,
the second inner lateral grooves include:
a constricted part having a minimum groove width and disposed on a center side in a groove length direction,
an outer widened part whose width gradually increases from the constricted part to the outer circumferential main groove, and
an inner widened part whose width gradually increases from the constricted part to the inner circumferential main groove,
a groove depth of the second inner lateral grooves is almost constant over the entire length,
a groove depth of the narrow-width part of the first inner lateral groove is smaller than a groove depth of the wide-width part of the first inner lateral groove.

2. The pneumatic tire according to claim 1, wherein the inner block comprises an acute-angle-side corner part and an obtuse-angle-side corner part at a position where the second inner lateral groove intersects with the outer circumferential main groove, and,
at an acute-angle-side groove side edge of the second inner lateral groove which constitutes the acute-angle-side corner part, a tangent line of the acute-angle-side groove side edge at a tip of the acute-angle-side corner part has an angle θ2o in the range of 0 to 10° with respect to the axial line.

3. The pneumatic tire according to claim 2, wherein the inner block comprises an acute-angle-side corner part and an obtuse-angle-side corner part at a position where the second inner lateral groove intersects with the inner circumferential main groove, and,
at an obtuse-angle-side groove side edge of the second inner lateral groove which constitutes the obtuse-angle-side corner part, a tangent line of the obtuse-angle-side groove side edge at a tip of the obtuse-angle-side corner part has an angle θ2i with respect to the axial line, which is larger than the angle θ2o.

4. The pneumatic tire according to any of claims 1 to 3 wherein outer land portions on the axially outer sides of the outer circumferential main groove is divided into multiple circumferentially arranged outer blocks by multiple outer lateral grooves which extend axially outwardly from the outer circumferential main groove beyond the tread ground-contact end, and
the outer lateral grooves include:
a narrow-width part on the axially inner side and connecting to the outer circumferential main groove, and a wide-width part on the axially outer side and connecting to the tread ground-contact end, and a groove depth of the narrow-width part is smaller than a groove depth of the wide-width part.

5. The pneumatic tire according to claim 4 wherein a groove centerline of the outer lateral groove is inclined at an angle β of 0 to 15° with respect to the axial line.

6. The pneumatic tire according to claim 4, wherein the outer lateral groove includes a transitional part connecting the wide-width part and the narrow-width part, and a groove width of the transitional part gradually decreases toward the axial inner side from the wide-width part to the narrow-width part.

7. The pneumatic tire according to claim 6, wherein a ratio (L12i/L12o) of an axial length (L12i) of the narrow-width part of the outer lateral groove to an axial length (L12o) of the wide-width part of the outer lateral groove is 0.30 to 0.50.

8. The pneumatic tire according to claim 6, wherein a ratio (H12i/H12o) of a groove depth H12i of the narrow-width part of the outer lateral groove to a groove depth H12o of the wide-width part of the outer lateral groove is 0.55 to 0.75.

9. The pneumatic tire according to claim 6, wherein an axial length (L12i) of the narrow-width part of the outer lateral groove is 0.1 to 0.4 times of an axial entire length (L12) of the outer lateral groove.

10. The pneumatic tire according to claim 1 wherein there are the four circumferential main grooves, a center land portion is formed between the inner circumferential main grooves, and the center land portion includes center slots which extend from one inner circumferential main groove to a tire equatorial plane side and terminate without reaching other inner circumferential main groove.

11. The pneumatic tire according to claim 1 wherein in the second inner lateral groove, the opening width of the inner widened part is larger than the opening width of the outer widened part.

* * * * *